(12) United States Patent
Boyersmith et al.

(10) Patent No.: US 9,552,441 B2
(45) Date of Patent: *Jan. 24, 2017

(54) DATABASE MAPPING OF MODELS FOR REPORTING TOOLS IN MODEL DRIVEN DEVELOPMENT

(71) Applicant: International Business Machines Corporation, Armonk, NY (US)

(72) Inventors: Michael J. Boyersmith, Beaverton, OR (US); Barys Dubauski, Beaverton, OR (US); Maged E. Elaasar, Kanata (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/867,003

(22) Filed: Sep. 27, 2015

(65) Prior Publication Data

US 2016/0019312 A1    Jan. 21, 2016

Related U.S. Application Data

(63) Continuation of application No. 12/496,290, filed on Jul. 1, 2009, now Pat. No. 9,164,738.

(51) Int. Cl.
*G06F 7/00* (2006.01)
*G06F 17/30* (2006.01)
*G06F 9/44* (2006.01)
*G06F 13/14* (2006.01)

(52) U.S. Cl.
CPC .......... *G06F 17/30917* (2013.01); *G06F 8/35* (2013.01); *G06F 17/30595* (2013.01); *G06F 17/30923* (2013.01)

(58) Field of Classification Search
CPC ................... G06F 17/30563; G06F 17/30917; G06F 17/30914; G06F 17/30595; G06F 17/2247; G06F 17/30557; G06F 17/30569; G06F 17/30985; G06F 17/227; G06F 17/30286; G06F 17/30427; G06F 17/30607; G06F 17/3086; G06F 8/24; G06F 8/51; G06F 9/4428

(Continued)

(56) References Cited

U.S. PATENT DOCUMENTS 7,925,658 B2 *  4/2011  Colaco .............. G06F 17/30917
                                                   707/610
8,261,204 B1 *  9/2012  Huynh .................. G06F 17/243
                                                   715/218

(Continued)

*Primary Examiner* — Usmaan Saeed
*Assistant Examiner* — Cecile Vo
(74) *Attorney, Agent, or Firm* — Steven M. Greenberg, Esq.; CRGO Law

(57) ABSTRACT

Embodiments of the present invention provide a method, system and computer program product for mapping models to relational databases for reporting tools. In an embodiment of the invention, a model mapping method for models of a model driven development (MDD) environment can include initializing a database table and selecting a data source storing a modeling framework representation of a model. A first query can be executed against an application programming interface (API) of the data source supporting a modeling framework query language to retrieve selected elements of the model. Likewise, a second query can be executed against the API of the data source to retrieve selected attributes of the selected elements of the model. Finally, rows of the database table can be populated with the retrieved selected elements of the model and corresponding columns of the database table can be populated with the retrieved selected attributes of the selected elements of the model. Consequently, a report can be generated for the model based upon the rows and columns of the database table.

10 Claims, 2 Drawing Sheets

(58) Field of Classification Search
USPC ........ 707/999.1, E17.125, 999.002, 999.102,
707/E17.014, 999.003, E17.006, E17.044,
707/999.101, E17.045, 999.006, 999.107,
707/E17.001, E17.122, E17.124, E17.126,
707/999.005, E17.127, 705, 756, 769,
707/791, 802, 803, 812, 999.004,
707/999.103, 999.104; 717/104, 102, 107
See application file for complete search history.

(56) References Cited

U.S. PATENT DOCUMENTS

2006/0015389 A1* 1/2006 Perham .................. G06Q 99/00
719/328
2007/0277151 A1* 11/2007 Brunel ...................... G06F 8/31
717/113

* cited by examiner

DATABASE MAPPING OF MODELS FOR REPORTING TOOLS IN MODEL DRIVEN DEVELOPMENT

CROSS-REFERENCE TO RELATED APPLICATIONS

This application is a Continuation of U.S. application Ser. No. 12/496,290, filed Jul. 1, 2009, now allowed, the entirety of which is incorporated herein by reference.

BACKGROUND OF THE INVENTION

Field of the Invention

The present invention relates to the field of model driven development and more particularly to reporting tools for reporting information contained in models produced in model driven development.

Description of the Related Art

Modern software systems have become increasingly pervasive and open-ended, and are expected to deliver critical computing services in a dependable manner across multiple, heterogeneous, computing environments. To better manage the complexity of developing modern software systems, software development strategies can be employed which raise the level of abstraction at which software systems are conceived, implemented and evolved. Model-driven development (MDD) represents one such software development strategy in which models are the primary artifacts of software development.

Modeling complex applications has several general benefits that can include a better understanding of the business or engineering situation at hand, the construction and design of application architectures, and the creation of visualizations of code and other forms of implementation. In this regard, the essence of modeling is abstraction and any visualization of code is indeed an abstraction in that application information can be selectively exposed while details deemed unnecessary or unwanted can be suppressed. In conventional MDD, visual models can be created utilizing model constructs or model types.

In a typical model driven development (MDD) process, models are first-class artifacts, and as such, consume a substantial amount of time and effort at the outset so that the models be used to generate lower level models and ultimately source code. Consequently, tools that help gain better understanding of the information contained in models are known to be very useful. Reporting tools for MDD are an important aspect of MDD and allow for the creation of custom views of the information contained in models—views that are easier to consume especially by non-technical individuals. At present, many reporting tools have been marketed for use in creating reports of information contained in models.

Notwithstanding, the use of reporting tools does not come without complication. Specifically, a discrepancy often exists between the format of data expected by the reporting tool and the format of data chosen for a model under consideration by the reporting tool. In this regard, a common format of models is the format proposed by the Object Management Group (OMG)—essentially a hierarchy of structured data that follows a meta-model or a schema. The OMG proposed format utilizes the extensible markup language (XML) variant, XML meta-data interchange (XMI) as a format for persisting models. In concert with XMI, the Eclipse Modeling Framework (EMF) provides a popular framework with services for defining meta-models, abstract syntax for modeling languages, which can be used to create conforming models and persisting them in XMI.

Notably, some of the more popular reporting tools such as the open-source Business Intelligence Reporting Tool (BIRT)—a plug-in to the Eclipse environment—are not designed to read structured data of models in its native format. Rather, most popular reporting tools are designed to handle data structured in the format of a database, specifically tables with rows and columns. To that end, it is thus required to map the structured representation of models to a database representation. This approach has been adopted in reporting tools by providing a generic XML based data mapping extension that is able to consume models as XML data that follows a certain XML schema. Such extensions use an XML-based query language, for instance "Xpath", as a query engine operating on the data of the model.

Nevertheless, some issues remain in using such solution for reporting on models in a MDD environment. In particular, XMI semantics are not completely described by XML; for example, XMI has the notion of multiple-inheritance that does not exist in XML. This incongruity results in the loss of information in transforming the information of the model from a native format to a database format. Also, model implementations often provide an application programming interface (API) that applies to the model data. In consequence, viewing a model through an API as pure data inhibits the ability to extrapolate useful information easily from models in the mapping process.

Addressing these inherent deficiencies, a two-phase approach has been proposed in which the first phase transforms models into simple XML data that can be easily consumed by the XML mapping process and the second phase performs the XML mapping. The XML transformation, however, introduces performance penalties resulting from additional required upfront processing, and complexity designing a new report-friendly XML schema and designing a mapping from the various meta-models to the new report friendly XML schema. These problems are often amplified if attempting to do a complete schema mapping that fits any report generically, rather than a tailored mapping for every report.

BRIEF SUMMARY OF THE INVENTION

Embodiments of the present invention address deficiencies of the art in respect to reporting tools for models in a MDD environment and provide a novel and non-obvious method, system and computer program product for mapping models to relational databases for reporting tools. In an embodiment of the invention, a model mapping method for models of a MDD environment can include initializing a database table and selecting a data source storing a modeling framework representation of a model. A first query can be executed against an API of the data source supporting a modeling framework query language to retrieve selected elements of the model. Likewise, a second query can be executed against the API of the data source to retrieve selected attributes of the selected elements of the model. Finally, rows of the database table can be populated with the retrieved selected elements of the model and corresponding columns of the database table can be populated with the retrieved selected attributes of the selected elements of the model. Consequently, a report can be generated for the model based upon the rows and columns of the database table.

In another embodiment of the invention, a data processing system can be configured for mapping a modeling framework representation of a model to a database representation of the model. The system can include a host computing platform with processor and memory, a database coupled to the host computing platform, and a mapping module. The mapping module can include program code executing in the memory by the processor of the host computing platform. The program code can be enabled upon execution by the processor to execute a first query against an API of a data source supporting a modeling framework query language to retrieve selected elements of a model and to execute a second query against the API of the data source to retrieve selected attributes of the selected elements of the model, and to populate rows of a database table in the database with the retrieved selected elements of the model and populating corresponding columns of the database table with the retrieved selected attributes of the selected elements of the model.

In one aspect of the embodiment, the data source can be an EMF representation of an instance model. As such, the modeling framework query language can include EMF object constraint language (EMF-OCL), or EMF extensible markup language (XML) path (EMF-Xpath). Additionally, the API further can include an extended directive configured as an EMF plug-in to concatenate an identifier for a specified element of the model with a resource path of the model. Comparably, the API further can include an extended directive configured as an EMF plug-in to resolve a retrieved identifier for a specified element as a context for another specified element in order to support processing nested data sets. In even yet another aspect of the embodiment the program code of the mapping module can be additionally enabled to generate an first additional table relating a specified element of the model to an identifier for the specified element of the model, and a second additional table relating the identifier to identifiers for other elements in a one-to-many relationship with the specified element.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for mapping a model to a database for reporting in a reporting tool for a MDD environment. In accordance with an embodiment of the present invention, a model defined in an MDD environment can be loaded from a corresponding XMI persistence as a data source in an EMF framework. Thereafter, a first query can be executed against the data source to produce the rows in a database representation of the model representative of the elements of the model. Also, a second query can be executed against the data source to produce the columns for each row in the database representation of the model representative of the attributes of the elements of the rows. As such, a mapping will have been generated between the database representation and the underlying model defined in the MDD environment. Finally, a report can be generated from records in the database to present a view to information in the model.

Figure 1:
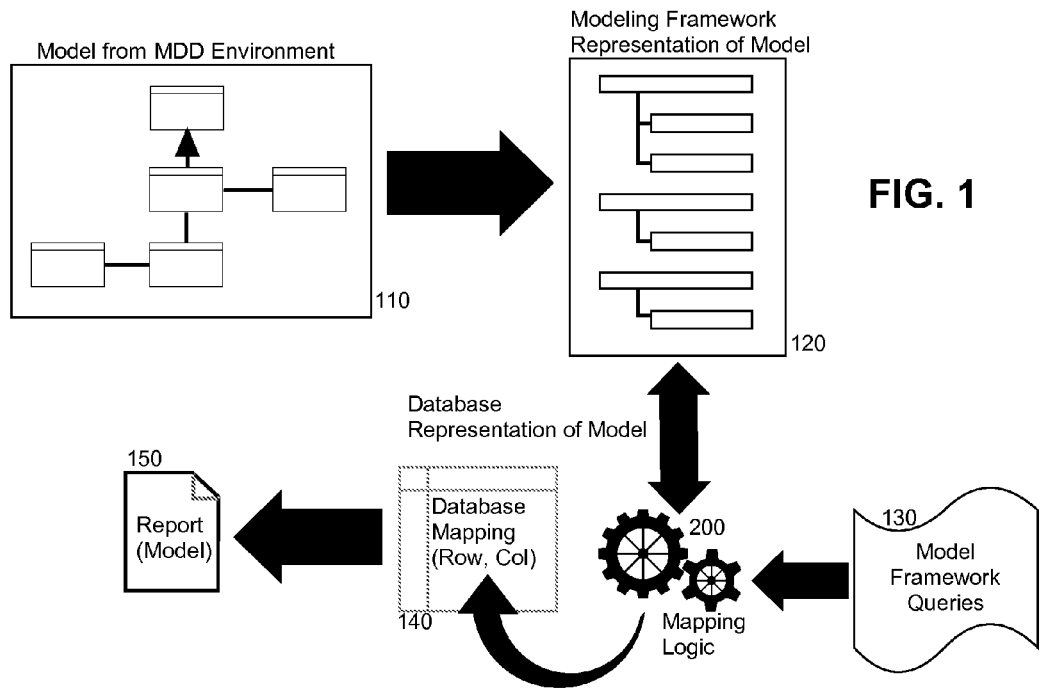
FIG. 1 is a pictorial illustration of a process for mapping a model to a database for reporting in a reporting tool for a MDD environment.

In further illustration, FIG. 1 pictorially depicts a process for mapping a model to a database for reporting in a reporting tool for a MDD environment. As shown in FIG. 1, a model 110 generated from an MDD environment can be persisted in fixed storage in the form of a modeling framework representation 120, such as an XMI persistence. Mapping logic 200 can execute model framework queries 130 against the modeling framework representation 120, for instance using object constraint language (OCL) or XML path (XPath) query language compliant queries. At least one of the model framework queries 130 can extract elements from the modeling framework representation 120 of the model 110 for corresponding rows of a database representation 140 of the model 110, while at least one other of the model framework queries 130 can extract attributes for the elements from the modeling framework representation 120 of the model 110 for the columns of the database representation 140 of the model 110. Thereafter, a reporting tool can produce reports 150 for the model 110 based upon the database representation 140 of the model 110.

Figure 2:
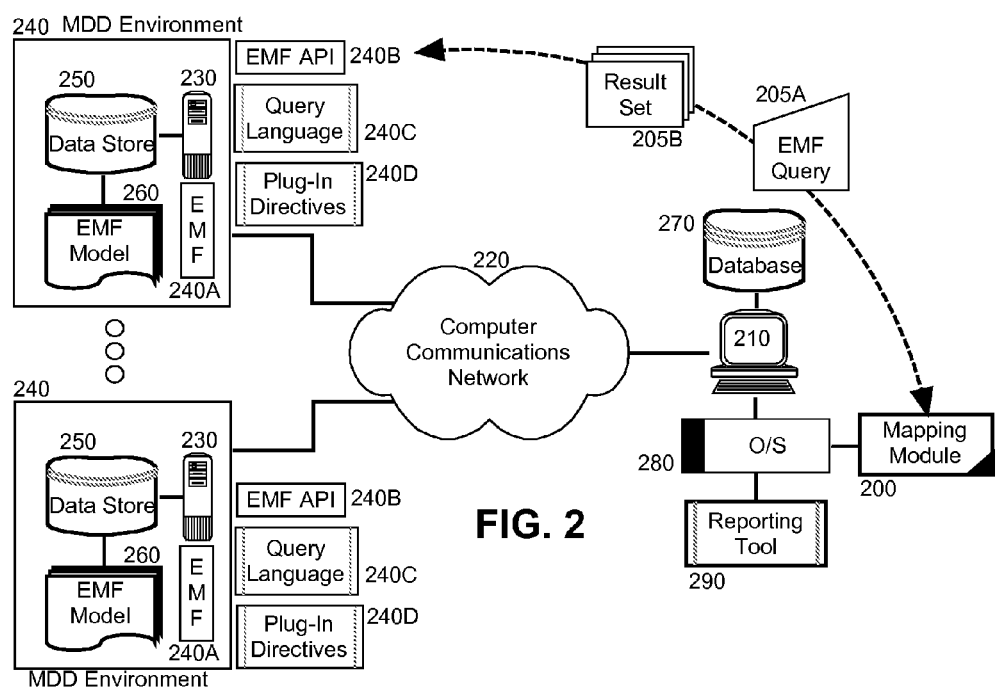
FIG. 2 is a schematic illustration of a MDD data processing system configured for mapping a model to a database for reporting in a reporting tool; and, FIG. 3 is a flow chart illustrating a process for mapping a model to a database for reporting in a reporting tool for a MDD environment.

The process described in connection with FIG. 1 can be embodied within an MDD data processing system. In this regard, FIG. 2 is a schematic illustration of a MDD data processing system configured for mapping a model to a database for reporting in a reporting tool. The system can include a host computing platform 210 with processor and memory, coupled to a database 270 and supporting the execution of an operating system 280 hosting the operation of a mapping module 200 accessing the database 270. Optionally, the operating system 280 further can host a reporting tool 290 for designing and generating reports based upon the content of the database 270, though the skilled artisan will recognize that the reporting tool 290 can be hosted by a different host computing platform accessing the database 270.

The host computing platform 210 can be configured for communicative coupling to one or more MDD environments 240 over a computer communications network 220, each MDD environment 240 including a server 230 supporting the execution of a modeling framework 240A such as the Eclipse modeling framework, providing an API 240B to the framework supporting one or more query languages 240C as well as query language extensions 240D to the query languages as a plug-in to the framework. The MDD environment 240 can include a modeling framework representation 260 of a model produced from the MDD environment 240, stored in a data store 250 and accessible through the server 230. For example, the modeling framework representation 260 can be an EMF representation of the model. Of note, the mapping module 200 can include program code that when executed in the memory of the host computing platform 210 by the processor of the host computing platform 210 can map the modeling framework representation 260 of a model to a database representation of the model in the database 270.

Specifically, at least two different queries 205A can be issued by the mapping module 200 to at least one of the data sources 240 in order to retrieve corresponding result sets 205B. The data sources 240 can refer to corresponding instance models and optionally one or more meta-data models. One query can extract a selection of model elements from the modeling framework representation 260 of the instance model to form the rows of a database representation of the model in the database 270. By comparison, another query can extract a selection of attributes of model elements from the modeling framework representation 260 of the instance model to form the columns of the database representation of the model in the database 270. Subsequently, the reporting tool 290 can access the database 270 in order to generate reports providing a view to the instance model.

Of note, the query languages 240B supported by the modeling framework 240A can include EMF-OCL or EMF-XPath. Yet, the query languages 240B can be extended to support additional query directives through the query language extensions 240D. For instance, the query language extensions 240D can include a directive to retrieve an identifier for a specified element of a modeling framework representation 260 of the instance model, and also a directive to retrieve a concatenation of a resource path and identifier for a specified element of the modeling framework representation 260 of the instance model. Using both directives, columns can be generated in the database representation of the instance model in the database 270 to be used as keys for joining different EMF data sets so as to more accurately identify the different elements present in different instance models referenced by the data sources 240.

Likewise, the query language extensions 240D can include a directive to resolve a retrieved identifier for an element as the context for another element in order to support the processing of nested data sets. Specifically, as reporting tools often support the notion of nested tables, in that an inner table can determine its context from an outer table. As such, a context need be passed from the data set of the outer table to the data set of the inner table. In most cases, the context of an EMF data set includes the root elements of all instance models in an associated data source. Therefore, the contexts must be passed to a data set through parameters. In the case of EMF data sets of EMF elements, EMF elements represented as parameters are limited to having simple types. Therefore, the use of an identifier or a concatenation of a resource path and identifier, which are strings, can be used as a context element in a data set so that once passed, the context can be resolved back to an EMF element. The extended directive for resolving the retrieved identifier can include logic to resolve a parameter formed from the extended directive producing either an identifier or a concatenation of a resource path and identifier back to EMF elements, depending on whether one or more instance models are used, respectively.

Notably, to support relationship mapping between elements in a model, a relationship element can be extracted during a row query to identify a model element, and the column query can include a reference by way of either an identifier or a concatenation of a resource path and identifier to another model element that enjoys a relationship with the identified model element. To handle multiple direct relationships between the identified model element and the other model elements (e.g. one to many, many to many), then a key can be provided as the column entry to an additional table that includes all elements related to the identified model element.

Figure 3:
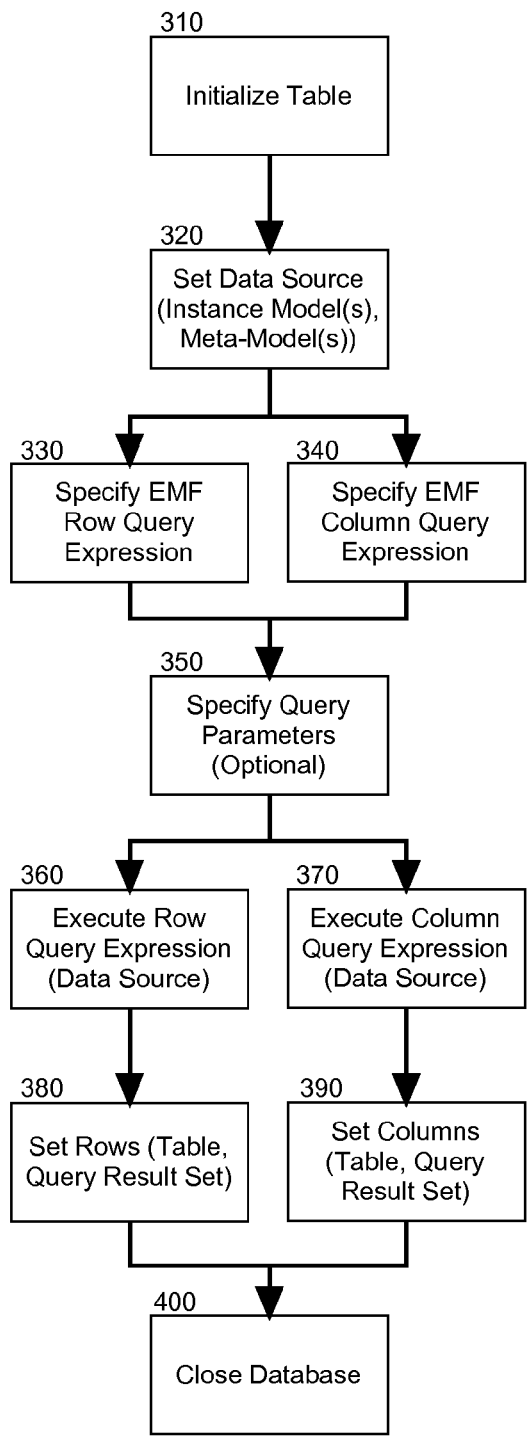

In more particular illustration of the methodology performed by the mapping module 200, FIG. 3 is a flow chart illustrating a process for mapping a model to a database for reporting in a reporting tool for a MDD environment. Beginning in block 310, a table in a database such as a relational database can be initialized for use and in block 320, one or more data sources of a modeling framework representation of a model can be specified—namely by way of a reference to one or more instance models and one or more meta-models produced for use with a MDD environment. The reference can include a path to the models and a file name of the models. In block 330, a query expression can be specified for the models to extract model elements from the data sources to populate the rows of the table, and in block 340 a query expression can be specified to extract attributes for the model elements from the data sources to populate the columns of the table. The query expressions can conform to a query language supported by a modeling framework through which the modeling framework representation of the models can be accessed. Examples include EMF-OCL and EMF-XPath.

In block 350, as an optional step, one or more parameters can be specified for use in the query expressions in order to simplify the specification of the query expressions. In this regard, the parameters can have a name, a type that is restricted to be a simple type, and a default value. Thereafter, the parameters can be used as a templated portion of the query expressions in lieu a manually specified portions of the query expressions. In any event, in block 360 the query expression for the rows can be executed against the data sources, and in block 370 the query expression for the column can be executed. In block 380, the result set produced by the query expression for the rows can be used to specify the rows of the table in respect to selected elements of the model, and in block 390, the result set produced by the query expression for the columns can be used to populate the columns of the table with attributes for corresponding elements specified for the rows. Finally, in block 400 the database can be closed for use by a reporting tool in generating reports for the model.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A model mapping method for models of a model driven development (MDD) environment, the method comprising:
   initializing a database table;
   selecting a data source storing a modeling framework representation of a model;
   executing a first query against an application programming interface (API) of the data source supporting an Eclipse modeling framework (EMF) object constraint language (OCL) query language to retrieve selected elements of the model and executing a second query against the API of the data source to retrieve selected attributes of the selected elements of the model; and,
   populating rows of the database table with the retrieved selected elements of the model and populating corresponding columns of the database table with the retrieved selected attributes of the selected elements of the model,
   wherein, the API also is enabled to support an EMF extensible markup language (XML) path (XPath) query language instead of an EMF OCL query language in order to retrieve selected elements of the model such that the second query is executed against the API of the data source to retrieve selected attributes of the selected elements of the model.

2. The method of claim 1, further comprising generating a report for the model based upon the rows and columns of the database table.

3. A data processing system configured for mapping a modeling framework representation of a model to a database representation of the model, the system comprising:
   a host computing platform with processor and memory;
   a database coupled to the host computing platform; and,
   a mapping module comprising program code executing in the memory by the processor of the host computing platform, the program code being enabled upon execution by the processor to initialize a database table in the database, select a data source storing a modeling framework representation of a model, execute a first query against an application programming interface (API) of a data source supporting an Eclipse modeling framework (EMF) object constraint language (OCL) query language to retrieve selected elements of a model and to execute a second query against the API of the data source to retrieve selected attributes of the selected elements of the model, and to populate rows of a database table in the database with the retrieved selected elements of the model and populating corresponding columns of the database table with the retrieved selected attributes of the selected elements of the model, wherein, the API also is enabled to support an EMF extensible markup language (XML) path (XPath) query language instead of an EMF OCL query language in order to retrieve selected elements of the model such that the second query is executed against the API of the data source to retrieve selected attributes of the selected elements of the model.

4. The system of claim 3, further comprising a reporting tool coupled to the database.

5. The system of claim 3, wherein the API further comprises an extended directive configured as an EMF plug-in to concatenate an identifier for a specified element of the model with a resource path of the model.

6. The system of claim 3, wherein the API further comprises an extended directive configured as an EMF plug-in to resolve a retrieved identifier for a specified element as a context for another specified element in order to support processing nested data sets.

7. The system of claim 3, wherein at least one of the queries comprises a parameter.

8. The system of claim 3, wherein the program code of the mapping module is further enabled to generate a first additional table relating a specified element of the model to an identifier for the specified element of the model, and a second additional table relating the identifier to identifiers for other elements in a one-to-many relationship with the specified element.

9. A computer program product comprising a non-transitory computer usable storage medium storing computer usable program code for models of a model driven development (MDD) environment, the computer program product comprising:
   computer usable program code for initializing a database table;
   computer usable program code for selecting a data source storing a modeling framework representation of a model;
   computer usable program code for executing a first query against an application programming interface (API) of the data source supporting an Eclipse modeling framework (EMF) object constraint language (OCL) query language to retrieve selected elements of the model and executing a second query against the API of the data source to retrieve selected attributes of the selected elements of the model; and,
   computer usable program code for populating rows of the database table with the retrieved selected elements of the model and populating corresponding columns of the database table with the retrieved selected attributes of the selected elements of the model,
   wherein, the API also is enabled to support an EMF extensible markup language (XML) path (XPath) query language instead of an EMF OCL query language in order to retrieve selected elements of the model such that the second query is executed against the API of the data source to retrieve selected attributes of the selected elements of the model.

10. The computer program product of claim 9, further comprising computer usable program code for generating a report for the model based upon the rows and columns of the database table.

* * * * *